(12) United States Patent
Allen

(10) Patent No.: US 8,369,677 B2
(45) Date of Patent: Feb. 5, 2013

(54) FIBER OPTIC CONNECTOR STORAGE APPARATUS AND METHODS FOR USING THE SAME

(75) Inventor: Barry Wayne Allen, Siler City, NC (US)

(73) Assignee: Tyco Electronics Corporation, Berwyn, PA (US)

(*) Notice: Subject to any disclaimer, the term of this patent is extended or adjusted under 35 U.S.C. 154(b) by 0 days.

(21) Appl. No.: 13/524,836

(22) Filed: Jun. 15, 2012

(65) Prior Publication Data

US 2012/0251066 A1 Oct. 4, 2012

Related U.S. Application Data

(63) Continuation of application No. 12/606,736, filed on Oct. 27, 2009, now Pat. No. 8,224,144.

(60) Provisional application No. 61/110,017, filed on Oct. 31, 2008.

(51) Int. Cl.
G02B 6/00 (2006.01)

(52) U.S. Cl. ............ 385/135; 385/134; 385/53; 385/76; 385/77; 385/139

(58) Field of Classification Search .................... 385/53, 385/55, 58, 59, 60, 72, 76, 77, 78, 92, 94, 385/134, 135, 136, 137, 138, 139
See application file for complete search history.

(56) References Cited

U.S. PATENT DOCUMENTS

| | | | |
|---|---|---|---|
| 5,202,949 A | 4/1993 | Hileman et al. | ............. 385/134 |
| 5,317,663 A | 5/1994 | Beard et al. | |
| 5,511,144 A | 4/1996 | Hawkins et al. | |
| 5,825,955 A | 10/1998 | Ernst et al. | |
| 5,883,995 A | 3/1999 | Lu | |
| 6,160,946 A | 12/2000 | Thompson et al. | |
| 6,227,717 B1 | 5/2001 | Ott et al. | |
| 6,234,683 B1 | 5/2001 | Waldron et al. | |
| 6,240,229 B1 | 5/2001 | Roth | |
| 6,289,159 B1 | 9/2001 | Van Hees et al. | |
| 6,347,888 B1 | 2/2002 | Puetz | |
| 6,424,781 B1 | 7/2002 | Puetz et al. | |
| 6,535,682 B1 | 3/2003 | Puetz et al. | |
| 6,760,531 B1 | 7/2004 | Solheid et al. | |
| 7,142,764 B2 | 11/2006 | Allen et al. | |
| 7,198,409 B2 | 4/2007 | Smith et al. | |

(Continued)

FOREIGN PATENT DOCUMENTS

EP 1 160 603 A1 12/2001
JP 2002-048941 A 2/2002

(Continued)

OTHER PUBLICATIONS

Notification of Transmittal of the International Search Report and the Written Opinion of the International Searching Authority, or the Declaration for corresponding PCT application No. PCT/US2009/005845, mailed Jun. 23, 2010.

(Continued)

*Primary Examiner* — Brian Healy
(74) *Attorney, Agent, or Firm* — Myers Bigel Sibley & Sajovec, PA

(57) ABSTRACT

A fiber optic connector storage apparatus for storing a fiber optic connector having an exposed ferrule includes a housing and a dust cap portion. The housing defines a socket to receive and hold the fiber optic connector. The dust cap portion is integral with the housing and is configured to receive and protect the exposed ferrule when the fiber optic connector is inserted into the socket.

24 Claims, 11 Drawing Sheets

U.S. PATENT DOCUMENTS

| | | | |
|---|---|---|---|
| 7,233,731 B2 | 6/2007 | Solheid et al. | |
| 7,245,813 B2 | 7/2007 | Brown et al. | 385/139 |
| 7,298,952 B2 | 11/2007 | Allen et al. | |
| 7,407,330 B2 | 8/2008 | Smith et al. | |
| 7,454,115 B2 | 11/2008 | Allen | |
| 8,224,144 B2 * | 7/2012 | Allen | 385/135 |
| 2003/0002812 A1 | 1/2003 | Lampert | |
| 2004/0001686 A1 | 1/2004 | Smith et al. | |
| 2005/0002633 A1 * | 1/2005 | Solheid et al. | 385/135 |
| 2006/0285814 A1 | 12/2006 | Brown et al. | 385/139 |
| 2008/0310795 A1 | 12/2008 | Parkman et al. | 385/60 |
| 2010/0111484 A1 | 5/2010 | Allen | 385/135 |
| 2012/0251066 A1 * | 10/2012 | Allen | 385/135 |

FOREIGN PATENT DOCUMENTS

| | | |
|---|---|---|
| JP | 2006-119163 A | 5/2006 |
| WO | WO 00/75706 A2 | 12/2000 |
| WO | WO 2007/106477 A3 | 9/2007 |

OTHER PUBLICATIONS

Notification Concerning Transmittal of International Preliminary Report on Patentability (Chapter I of the Patent Cooperation Treaty) in corresponding PCT Application No. PCT/US2009/005845, mailed May 12, 2011 (9 pages).

\* cited by examiner

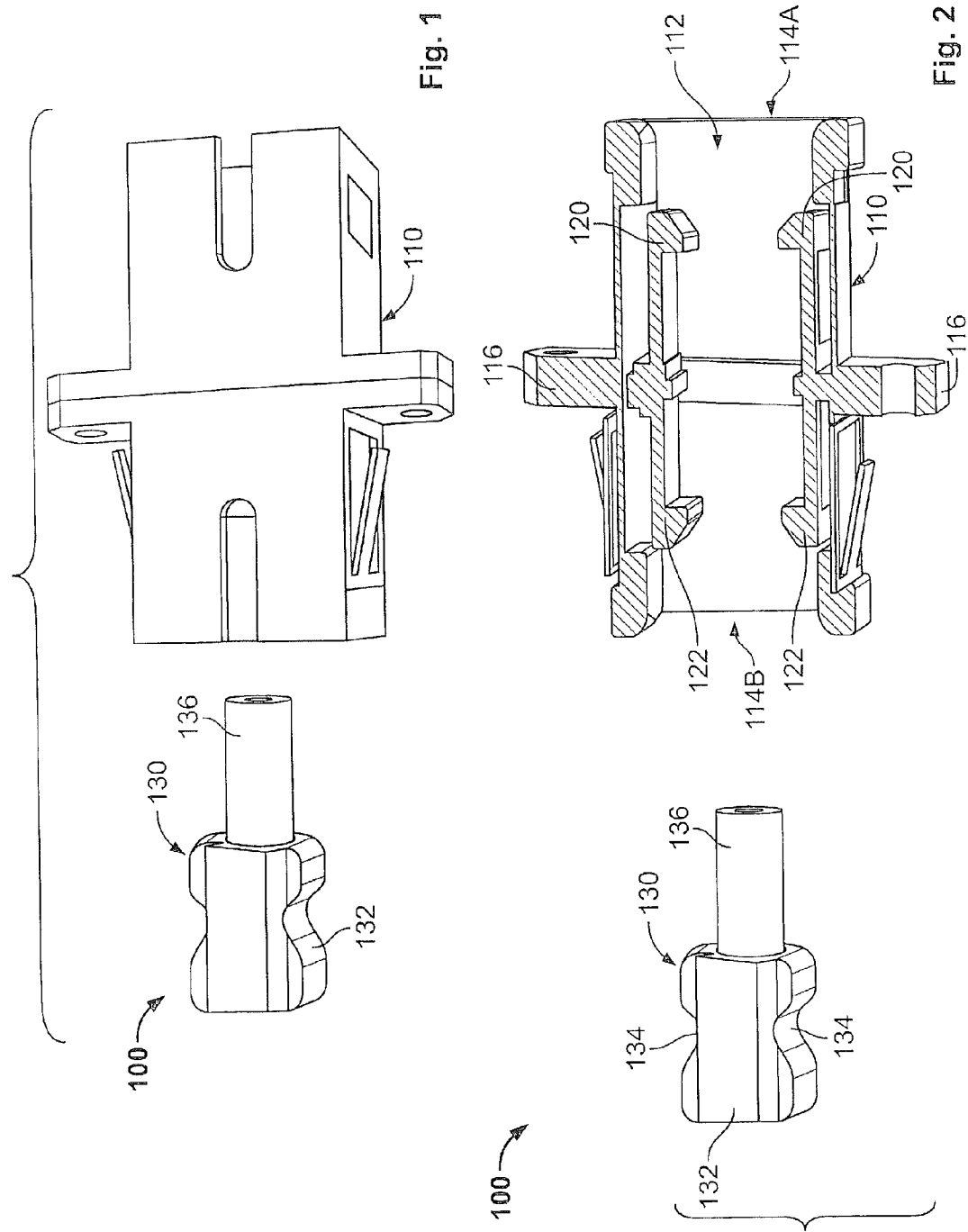

FIBER OPTIC CONNECTOR STORAGE APPARATUS AND METHODS FOR USING THE SAME

RELATED APPLICATION(S)

The present application is a continuation of and claims priority from U.S. patent application Ser. No. 12/606,736, filed Oct. 27, 2009 now U.S. Pat. No. 8,224,144, which claims the benefit of and priority from U.S. Provisional Patent Application Ser. No. 61/110,017, filed Oct. 31, 2008, the disclosures of which are incorporated herein by reference.

FIELD OF THE INVENTION

The present invention relates to optical fiber communications and, more particularly, to fiber optic connector storage apparatus.

BACKGROUND OF THE INVENTION

Optical fiber networks are increasingly being installed to support high speed voice and data communications. Increasingly, the optical fiber coupling is being expanded out from the central office of the communication service provider companies, such as Regional Bell Operating Companies (RBOCs) to the subscriber locations, such as homes or businesses, where conventional copper wiring was conventionally used. In various locations in a fiber optic network, prepositioned optical connectors must be stored and organized for use at a time later than when they are initially installed. This process is commonly known as parking a connector. Such is the case for optical splitter cabinets that require parking of splitter outputs. These outputs, at time of construction, use an apparatus and methodology for organizing the connectors that are awaiting connection to customers yet to be defined. Yet another example is the case for connectors that have been prepositioned in Multi Dwelling Units (MDU's). These parked connectors facilitate an expedited final installation when a subscriber decides to take service. The parking can be reused when a subscriber decides to terminate service and the optical feed requires disconnection and storage for later reuse, for example.

Some conventional methods and practices used for storing unused connectors include using a standard adapter and a separate dust cap that can be fitted on an end of a ceramic sleeve forming a part of the adapter. This method may be costly because it incorporates a precision metal or ceramic sleeve that is found in adapters. In addition, the connector's ceramic ferrule end face is generally not environmentally sealed against contaminants from the atmosphere. Another known method eliminates the sleeve section of the adapter and allows an appropriately sized dust cap pre-mounted on the connector to be inserted into the adapter. This method requires the person installing the connector to remove the dust cap by hand upon removal from the adapter. With no integrated place to store the dust cap for later use, the removed dust cap typically becomes litter that is dropped on the ground around the enclosure as the installer focuses on the work at hand. As optical components enter living units, the random discarding of dust caps may present a choking hazard to small children.

SUMMARY OF THE INVENTION

According to embodiments of the present invention, a fiber optic connector storage apparatus for storing a fiber optic connector having an exposed ferrule includes a housing and a dust cap portion. The housing defines a socket to receive and hold the fiber optic connector. The dust cap portion is integral with the housing and is configured to receive and protect the exposed ferrule when the fiber optic connector is inserted into the socket.

According to embodiments of the present invention, an optical fiber management system for use with a fiber optic connector having an exposed ferrule includes an interconnect cabinet and a fiber optic connector storage apparatus. The interconnect cabinet has a mounting panel. The fiber optic connector storage apparatus includes a housing and a dust cap portion. The housing is mounted on the mounting panel and defines a socket to receive and hold the fiber optic connector. The dust cap portion is integral with the housing and is configured to receive and protect the exposed ferrule when the fiber optic connector is inserted into the socket.

According to method embodiments of the present invention, a method for storing a fiber optic connector having an exposed ferrule includes providing a fiber optic connector storage apparatus including: a housing defining a socket to receive and hold the fiber optic connector; and a dust cap portion integral with the housing and configured to receive and protect the exposed ferrule when the fiber optic connector is inserted into the socket. The method further includes inserting the fiber optic connector into the socket such that the exposed ferrule thereof is received in and protected by the dust cap portion.

Further features, advantages and details of the present invention will be appreciated by those of ordinary skill in the art from a reading of the figures and the detailed description of the embodiments that follow, such description being merely illustrative of the present invention.

BRIEF DESCRIPTION OF THE DRAWINGS

FIG. 1 is an exploded perspective view of a parking device according to embodiments of the present invention.

FIG. 2 is an exploded perspective view of the parking device of FIG. 1 wherein a housing thereof is shown in cross-section.

DETAILED DESCRIPTION OF EMBODIMENTS OF THE INVENTION

Figure 3:
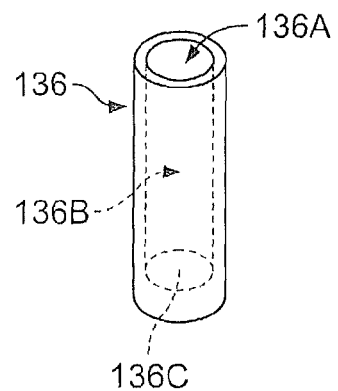
FIG. 3 is a perspective view of a dust cap sleeve forming a part of the parking device of FIG. 1.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

Various embodiments of the present invention provide fiber optic connector storage apparatus and methods for using the same that may be beneficial in optical enclosure environments as will now be described with reference to the embodiments illustrated in the Figures. Fiber optic connector storage apparatus (parking devices) according to some embodiments of the present invention may be used in closures, cabinets, boxes, shelves and the like. They may be arranged in a group to form a bulk head or provided as a single device intended for just one fiber optic connector. These parking devices may be placed on a panel or in any suitable location that would allow reasonable access to the parked fiber optic connector.

With reference to FIGS. 1-7, a fiber optic connector storage apparatus or parking device 100 according to some embodiments of the present invention will now be described. The parking device 100 can be used to temporarily store an optical fiber connector 50 (FIG. 5), for example. The parking device 100 may be mounted in a cabinet, such as an interconnect cabinet or fiber distribution hub, for example. The parking device 100 includes an adapter housing 110 and a dust cap portion or assembly 130.

Figure 5:
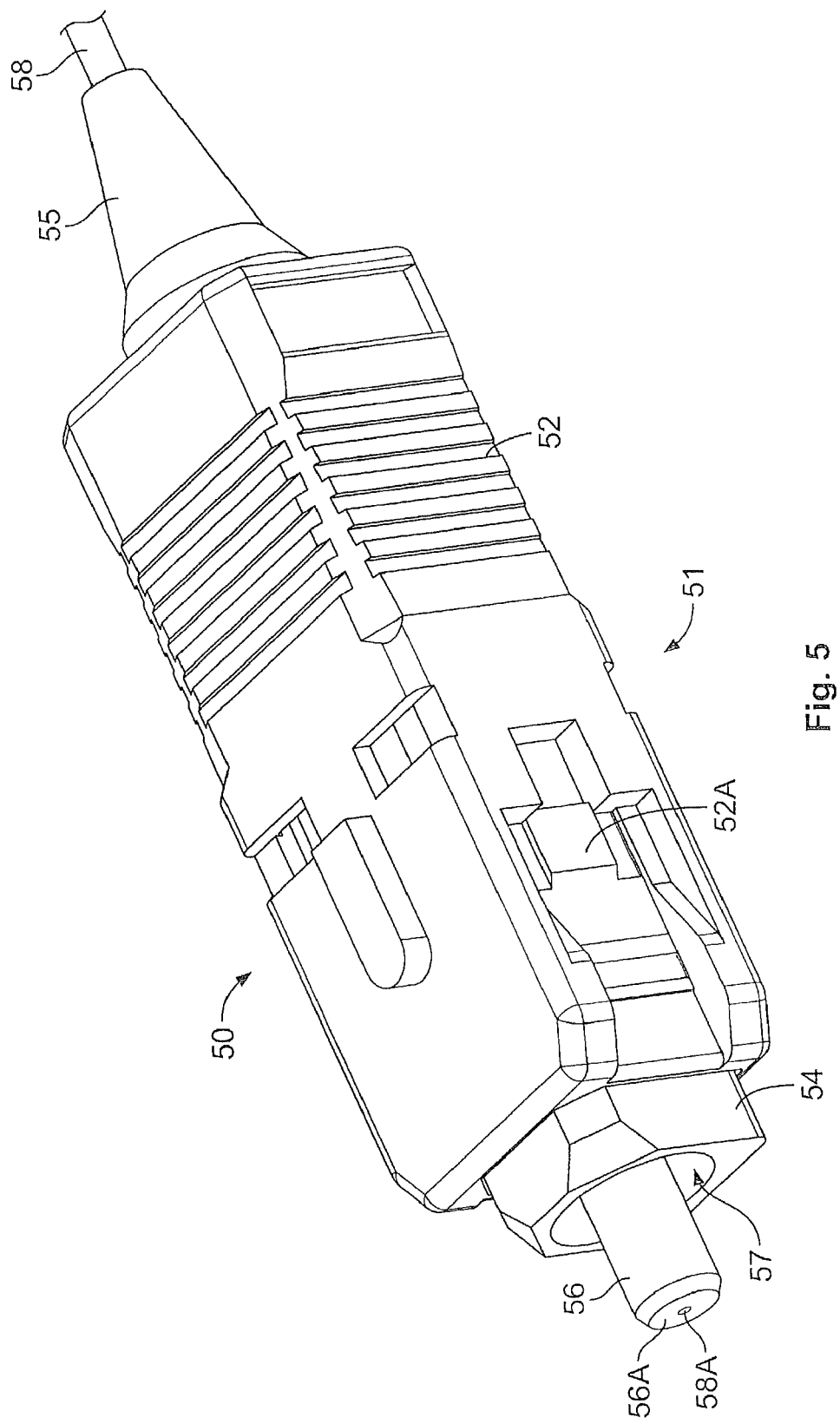
FIG. 5 is a perspective view of a connectorized optical fiber (pigtail) for use with the parking device of FIG. 1.

With reference to FIG. 5, the connector 50 is exemplary and may be, for example, an FC-type or SC-type connector terminating an optical fiber 58 to form a connectorized optical fiber (also referred to as a pigtail) 51. The optical fiber 58 includes a waveguide (typically formed of glass). The waveguide may be protected by a resin and/or jacket, for example, outside of the connector 50.

As shown, the connector 50 is an SC-type fiber optic connector. The connector 50 includes an outer housing 52, a forward tubular housing 54, a strain relief boot 55, and a ferrule 56 (e.g., formed of ceramic). The waveguide of the optical fiber 58 extends into the connector 50 and through the ferrule 56 and terminates at a waveguide end face 58A adjacent or coincident with an end face 56A of the ferrule 56. The ferrule 56 has a smaller diameter or width than those of the housings 52, 54. The outer diameter of the ferrule 56 and the inner diameter of the housing 54 define an annular passage or slot 57 therebetween. Latch detents 52A are provided on the sides of the housing 52.

With reference to FIGS. 1-4, the parking device 100 includes an adapter housing 110. The adapter housing 110 defines a through passage or socket 112 communicating with an entry end opening 114A and an opposing rear end opening 114B. Device mount tabs 116 may be provided to secure the housing 110 to a panel or the like. Connector latch structures 120 and dust cap latch structures 122 are provided in the socket 112. The socket 112 may be sized and shaped to satisfy a prescribed standard for the intended connector 50.

The dust cap assembly 130, as best seen in FIG. 2, includes a mount housing 132 having detents 134 configured to securely interlock with the latch structures 122. A dust cap sleeve 136 is fixed within the mount housing 132. The dust cap sleeve 136 has an inner passage 136B, an entry end opening 136A communicating with the passage 136B, and a closed end wall 136C opposite the opening 136A. The inner passage 136B defines a parking device insertion axis A-A (FIG. 4).

Figure 4:
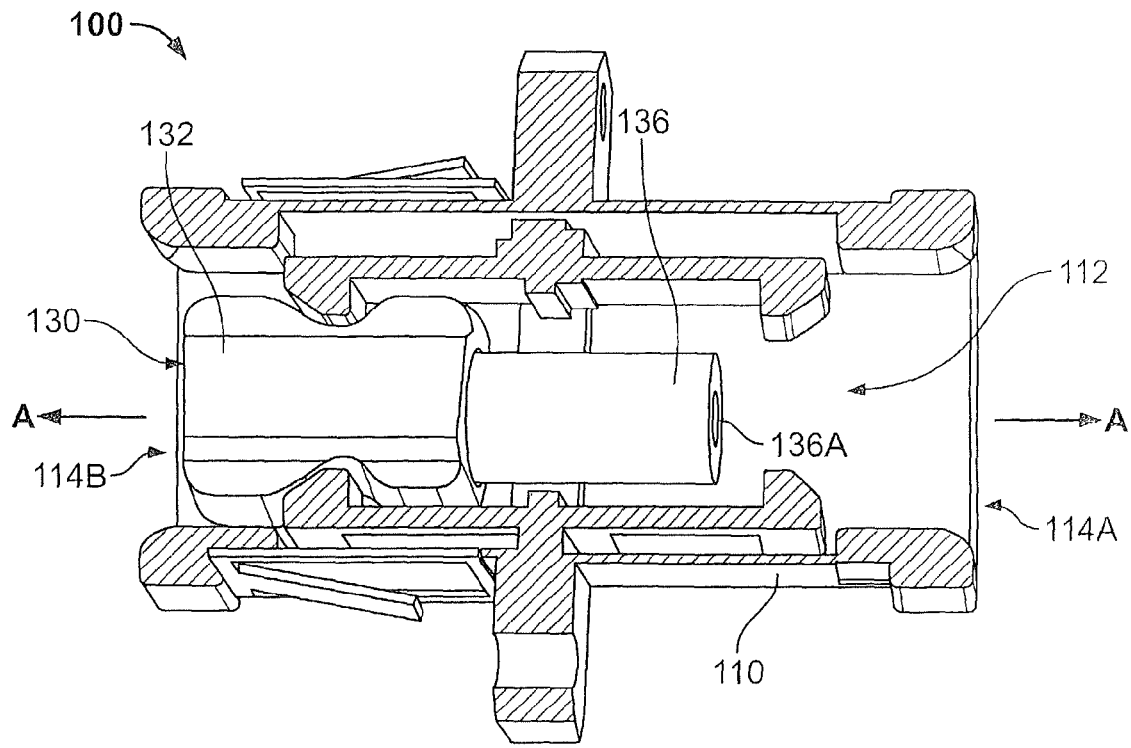
FIG. 4 is a partial cross-sectional view of the parking device of FIG. 1 wherein the housing is shown in cross-section.
Figure 6:
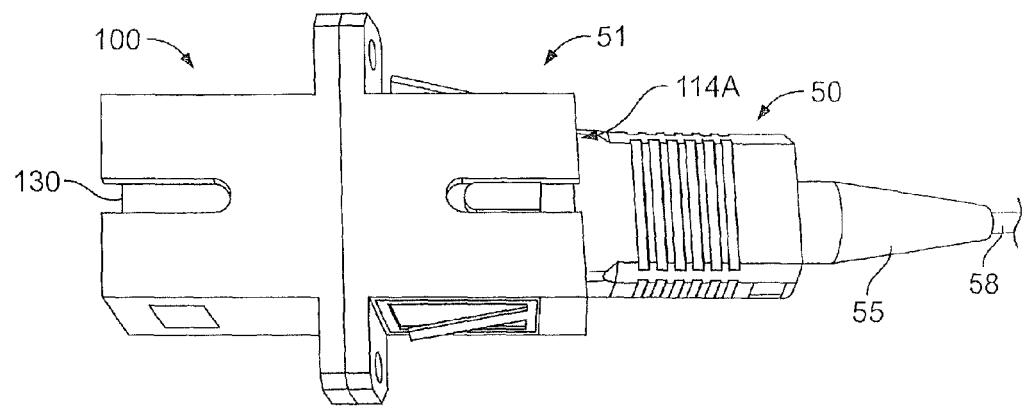
FIG. 6 is a perspective view of the connectorized optical fiber of FIG. 5 installed in the parking device of FIG. 1.
Figure 7:
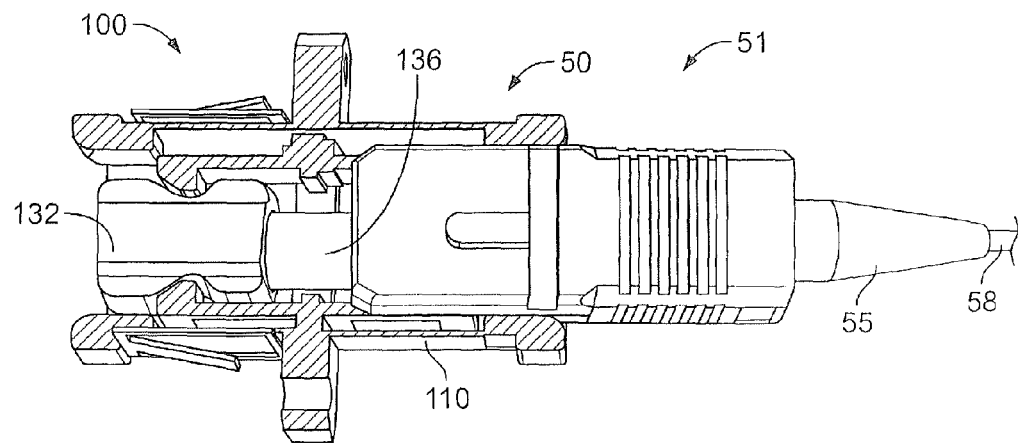
FIG. 7 is a partial cross-sectional view of the connectorized optical fiber of FIG. 5 installed in the parking device of FIG. 1.

The dust cap assembly 130 is installed in the adapter housing 110 as shown in FIG. 4. This may be accomplished by assembly at the factory or in the field by an installer. The dust cap assembly 130 is effectively captured within the socket 112 by engagement between the latch structures 122 and the detents 134. With the ferrule 56 exposed, the connector 50 is inserted along the insertion axis A-A into the socket 112 through the entry end opening 114A as shown in FIGS. 6 and 7. The connector 50 is held or locked in place by engagement between the latches 120 and the detents 52A.

Additionally, as the connector 50 is inserted in the socket 112, the ferrule 56 slides into the passage 136B of the dust cap sleeve 136. The parking device 100 will thereby also protect the fiber end face 58A. A lead portion of the dust cap sleeve 136 may slide into the forward tubular housing 54 of the connector 50. The interlock between the latches 122 and the detents 134 limits or prevents the dust cap assembly 130 from being dislodged from the adapter housing 110 when the connector 50 is inserted. That is, the grip of the latches 122 on the dust cap assembly 130 is sufficient to resist the force applied by the ferrule 56 entering the snug fitting dust cap sleeve 136 without allowing the dust cap assembly 130 to be ejected thereby from the adapter housing 110.

According to some embodiments, when the connector 50 is fully seated in the socket 112, the ferrule end face 56A and the fiber end face 58A will oppose the end wall 136C and may be closely adjacent or, less typically, in contact with the end wall 136C. According to some embodiments, at least 66% of the exposed length of the ferrule 56 is disposed in the passage 136B. According to some embodiments, the interior of the dust cap sleeve 136 defined by the passage 136B will conform to or fit snugly or form-fitting against the side wall of the ferrule 56. According to some embodiments, the dust cap sleeve 136 will form an air-tight seal about the ferrule 56. In some embodiments, the dust cap sleeve 136 is resilient and elastic and the inner diameter of the dust cap sleeve 136 is substantially the same as or less than the outer diameter of the ferrule 56. According to some embodiments, the sleeve passage 136B is sized and configured to resist or even prevent insertion of a ferrule having a dust cap thereon into the dust cap sleeve 136.

The connector 50 may subsequently be withdrawn from the socket 112, whereupon the ferrule 56 is removed from the dust cap sleeve 136. The dust cap sleeve 136 will be retained in the socket 112 (as shown in FIG. 4) by the interlock between the latches 122 and the detents 134. The removed connector 50 may be reinstalled in another socket or jack to make an interconnection to enable service to a customer via the pigtail 51, for example.

The housings 110, 132 and the dust cap sleeve 136 may be formed of any suitable material(s). According to some embodiments, these components are molded polymers. According to some embodiments, the dust cap sleeve 136 is formed of a different material than the housing 110. According to some embodiments, the dust cap sleeve 136 is formed of a softer material than the housing 110. According to some embodiments, the dust cap sleeve 136 is formed of a polymeric material having a hardness less than that of the housing 110. According to some embodiments, the dust cap sleeve 136 is formed of a material having a Shore D hardness in the range of from about 45 to 90. According to some embodiments, the housing 110 is formed of a material having a Rockwell Hardness in the range of from about R90 to R120. According to some embodiments, the dust cap sleeve 136 is formed of low-density polyethylene, high-density polyethylene, polypropylene and/or polyvinyl chloride. The adapter housing 110 and the dust cap mount housing 132 may be formed of ABS-poly(acylonitrile, butadiene, styrene), or polycarbonate plastic.

The parking device 100 can overcome the problems discussed hereinabove by providing an apparatus for temporarily storing a fiber optic connector or pigtail such that the ferrule thereof is protected from dust or other environmental contaminants. The parking device 100 enables the connector 50 to be installed with the ferrule 56 exposed (i.e., without a dust cover or cap on the ferrule 56) so that the ferrule 56 can be protected without requiring the provision or subsequent handling of such a dust cover or cap.

Figure 8:
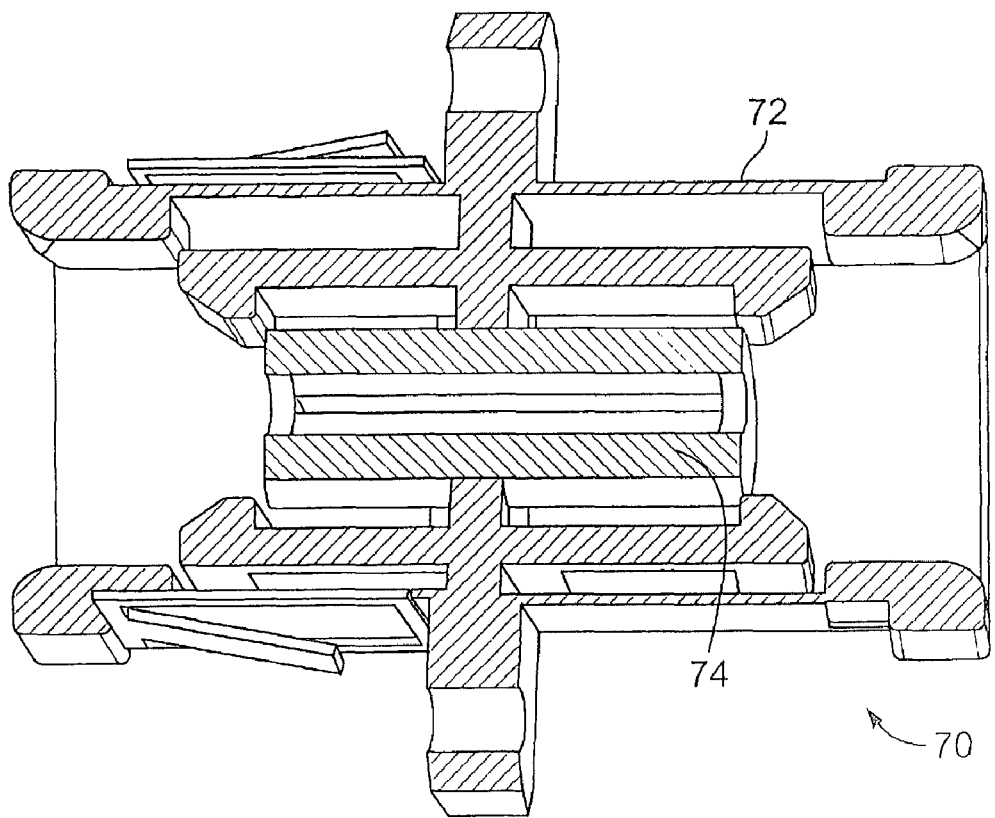
FIG. 8 is a cross-sectional view of an adapter that can replace the parking device of FIG. 1 in a panel.

According to some embodiments, the parking device 100 is configured to fit the dimensional requirements of a standard fiber optic connector adapter used to mate two connectors (i.e., the parking device 100 has the same outer form factor as a standard fiber optic connector adapter). In this case, the parking device 100 may be removed from the mounting panel and replaced with an adapter 70 (e.g., a SC adapter) as shown in FIG. 8 including an outer housing 72 and a ceramic adapter guide sleeve 74.

Figure 9:
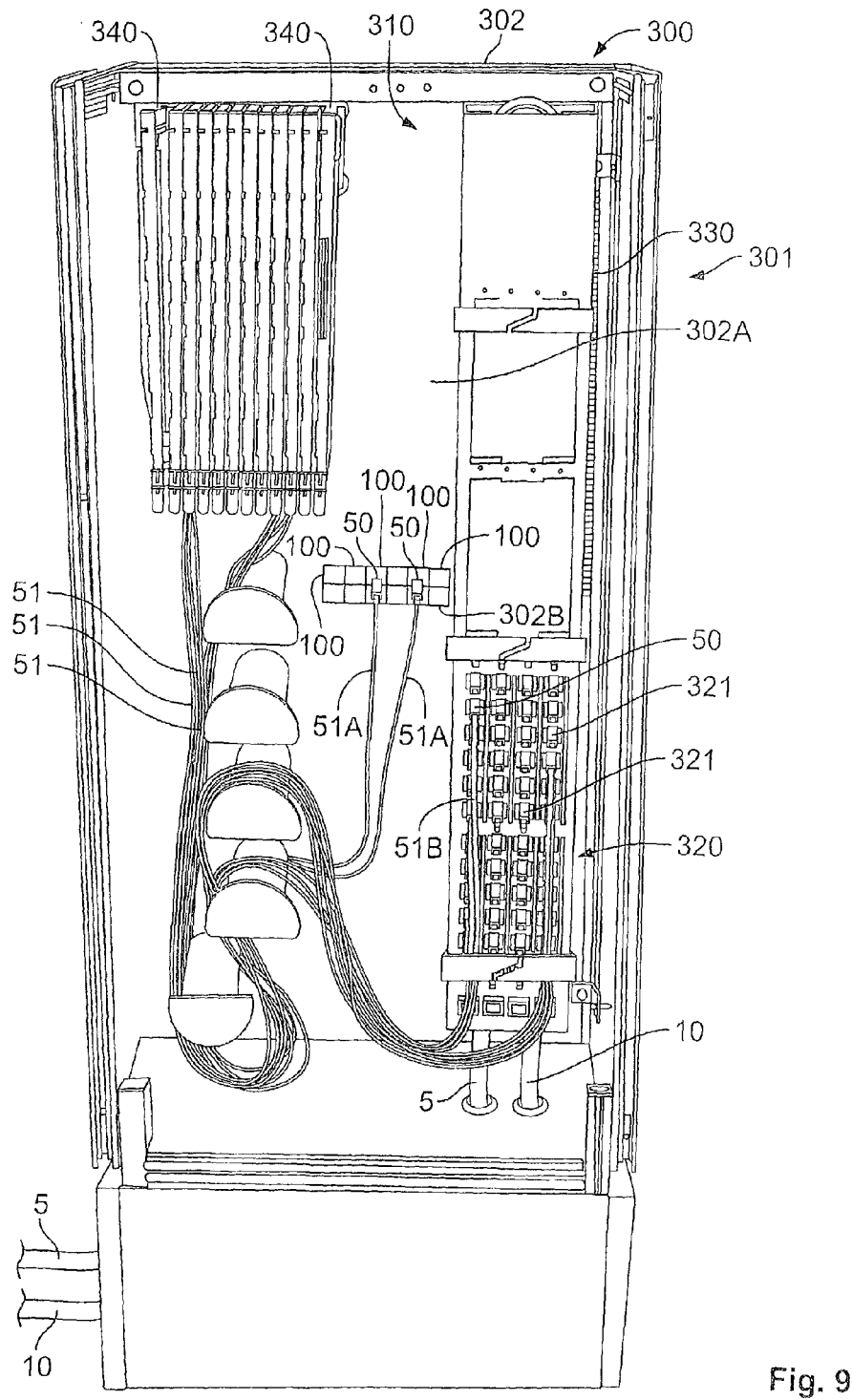
FIG. 9 is a front view of an optical fiber management system according to embodiments of the present invention and including a plurality of the parking devices of FIG. 1.

With reference to FIG. 9, an exemplary optical fiber management system 301 according to some embodiments of the present invention is shown therein. The system 301 includes an interconnect cabinet 300 and a plurality of the parking devices 100 mounted therein. The interconnect cabinet 300 may be constructed and used, for example, as disclosed in U.S. Pat. No. 7,142,764 to Allen et al., the disclosure of which is incorporated herein by reference.

The interconnect cabinet 300 includes an enclosure 302 defining a chamber 310 and having a backwall 302A. Subscriber cables 5 and outside office plant (OSP) cables 10 feed into the chamber 310. Splitter modules 340 are mounted on the backwall 302A and have connectorized fiber optic pigtails 51 extending therefrom. A termination panel 330 is further mounted in the enclosure 302 and has a connection member 320 including an array of sockets 321 configured to receive the connectors 50 of the connectorized pigtails 51.

The parking devices 100 are securely mounted in openings 302B in the backwall 302A using the device mount tabs 116, for example. As illustrated, the parking devices 100 are provided in a 2×6 array; however, it will be appreciated that other numbers and arrangements may be employed.

In use, certain of the pigtails 51A may not yet be needed to connect an optical fiber of the subscriber cable 5 to an optical fiber of the OSP cable 10. In this case, the connectors 50 of these unused pigtails 51A may be parked in selected ones of the parking devices 100 mounted on the backwall 302A. When desired, a pigtail 51B can be pulled out of its associated parking device 100 and plugged into an appropriate one of the sockets 321 as shown.

According to some embodiments, the parking device (or devices) 100 is provided or supplied as a unit or kit with a splitter module 340 and one or more fiber optic pigtails 51 extending from the splitter module 340. The parking device 100 may be pre-installed on the connector 50 of the pigtail 51 and the parking device 100 can be installed in the backwall 302A as discussed above (if desired, without removing the parking device 100 from the connector 50).

Figure 10:
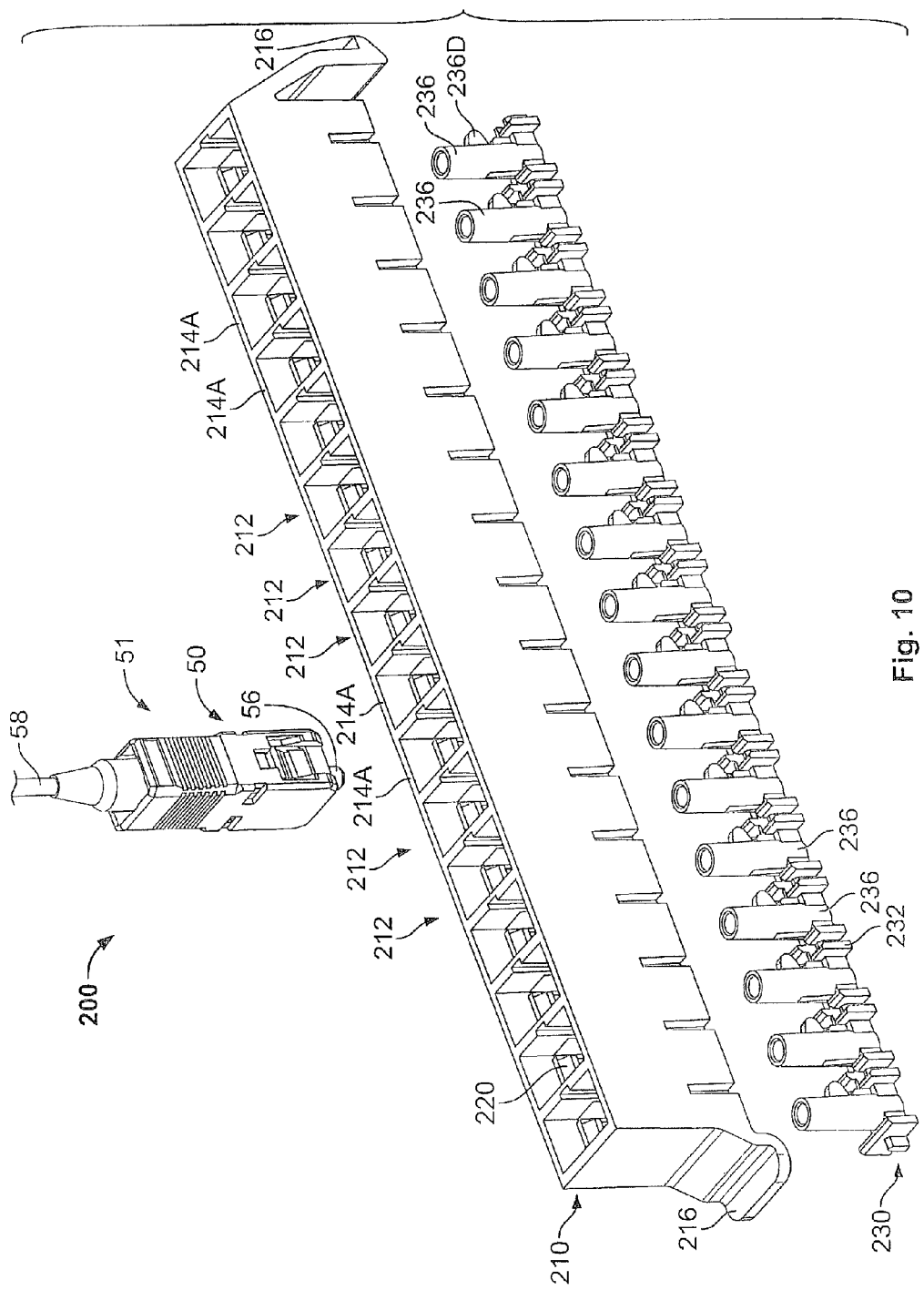
FIG. 10 is an exploded, perspective view of a parking device according to further embodiments of the present invention and a connectorized optical fiber.
Figure 11:
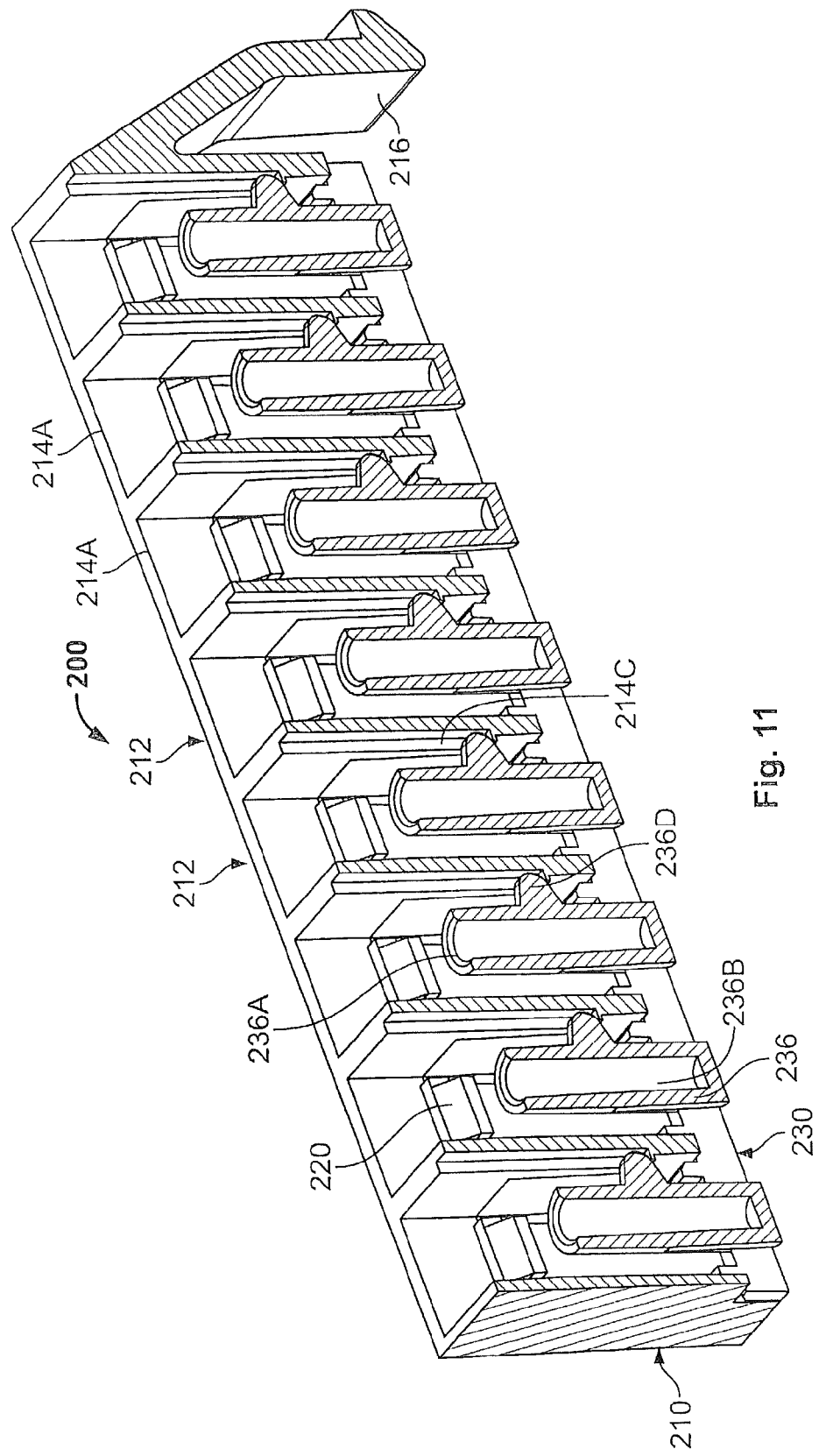
FIG. 11 is a cross-sectional, perspective view of the parking device of FIG. 10.
Figure 12:
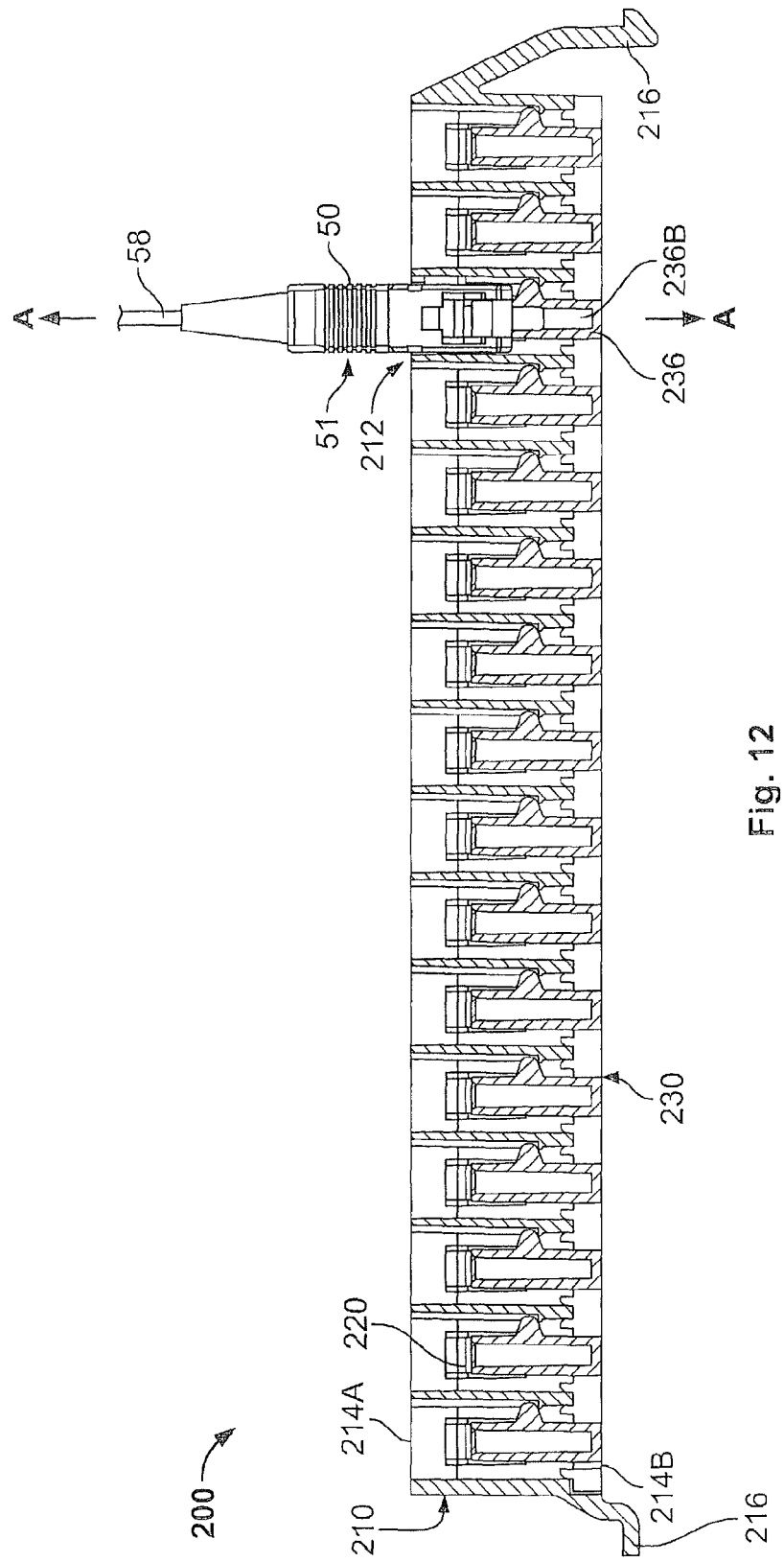
FIG. 12 is a cross-sectional view of the parking device of FIG. 10 with the connectorized optical fiber installed in a socket thereof.

With reference to FIGS. 10-12, a parking device 200 according to further embodiments of the present invention is shown therein. The parking device 200 includes an adapter housing 210 and a dust cap member 230.

The adapter housing 210 defines a plurality of serially and linearly arranged sockets 212. Each socket 212 has an entry end opening 214A, an opposite end opening 214B (FIG. 12), and latch structures 220 (FIG. 11) corresponding to features 114A, 114B, and 120, respectively. Device mount tabs 216 (shown as snap tabs in FIGS. 10-12) are provided to secure the housing 210 to a panel or the like.

The dust cap member 230 includes a base strip 232 and a plurality of serially and linearly arranged dust cap sleeves 236 projecting from a side of the base strip 232. The base strip 232 and the dust cap sleeves 236 may be integrally unitarily molded. Each dust cap sleeve 236 (FIG. 11) defines an inner passage 236B extending from an entry end opening 236A to an opposing end wall 236C.

The dust cap member 230 is mounted on the rear side of the housing 210 such that the dust cap sleeves 236 each extend into a respective one of the sockets 212 through the corresponding end opening 214B. According to some embodiments, the base strip 232 substantially fully covers the end openings 214B. The dust cap member 230 is securely affixed to the housing 210 by integral projections 236D that engage respective detents 214C in the housing 210 (FIG. 11). However, the dust cap member 230 may be affixed to the housing 210 by any other suitable mechanism, such as via snap fit, adhesive, adhesive tape, mechanical fasteners, welding and/or co-molding.

The parking device 200 can be used in the same manner as discussed above with regard to the parking device 100. Optical fiber connectors 50 can be inserted in each socket 212 and dust cap sleeve 236 along a respective insertion axis A-A (FIG. 12), and thereby parked in the socket 212 and dust cap sleeve 236. The connector latches 220 may hold each connector 50 while the dust cap sleeves 236 protect the fiber end faces of the connectors 50.

The housing 210 and the dust cap sleeve 236 may be formed of the same respective materials as described above with regard to the housing 110 and the dust cap sleeve 136.

The housing 210 may be interchangeable in a panel with a fiber optic adapter having the same or similar form factor.

While a linear array of sockets 212 and dust cap sleeves 236 is provided in the parking device 200, parking devices according to some embodiments of the present invention may be configured in other manners, such as a two-dimensional array of protected sockets.

Figure 13:
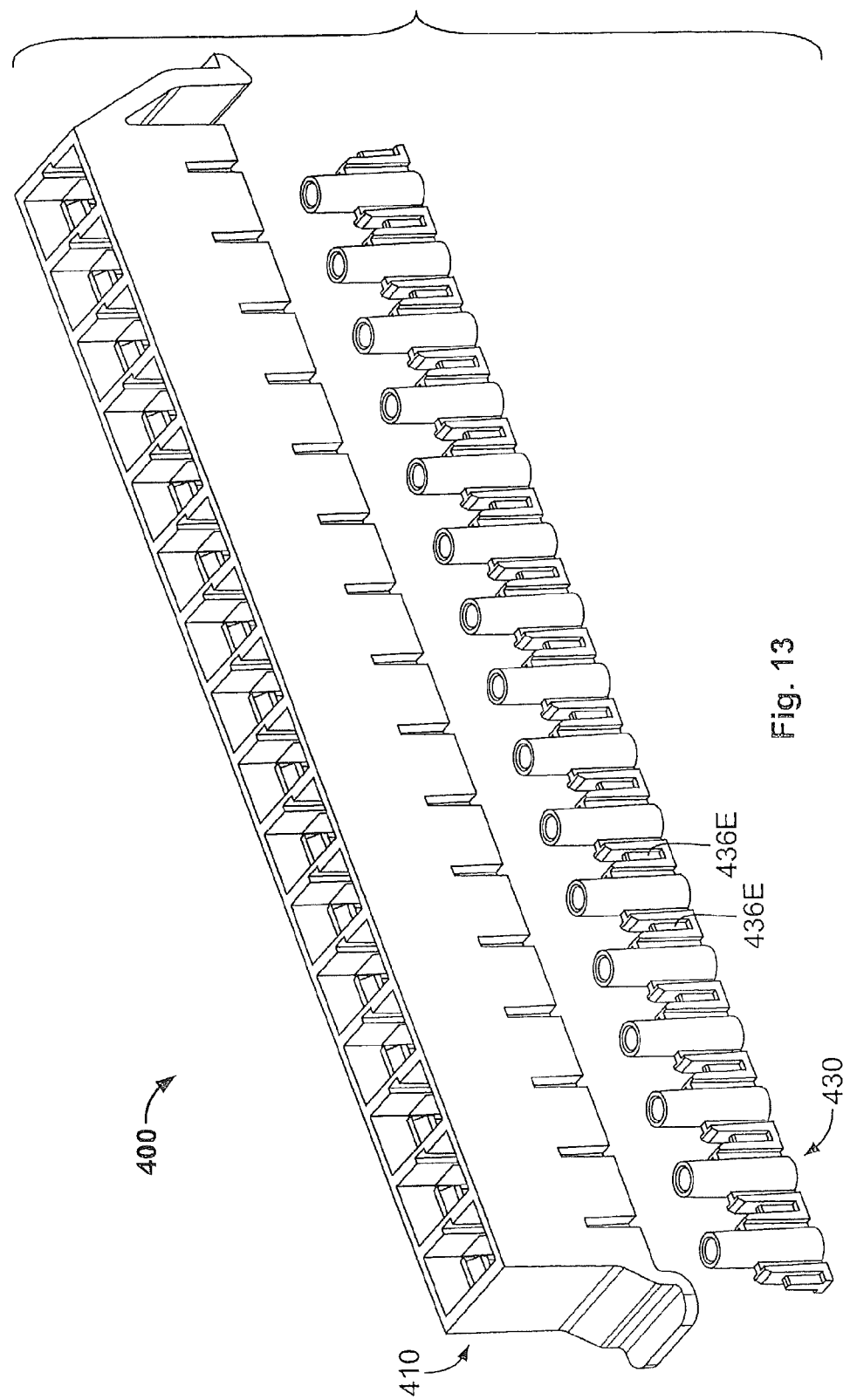
FIG. 13 is an exploded perspective view of a parking device according to further embodiments of the present invention and a connectorized optical fiber.
Figure 14:
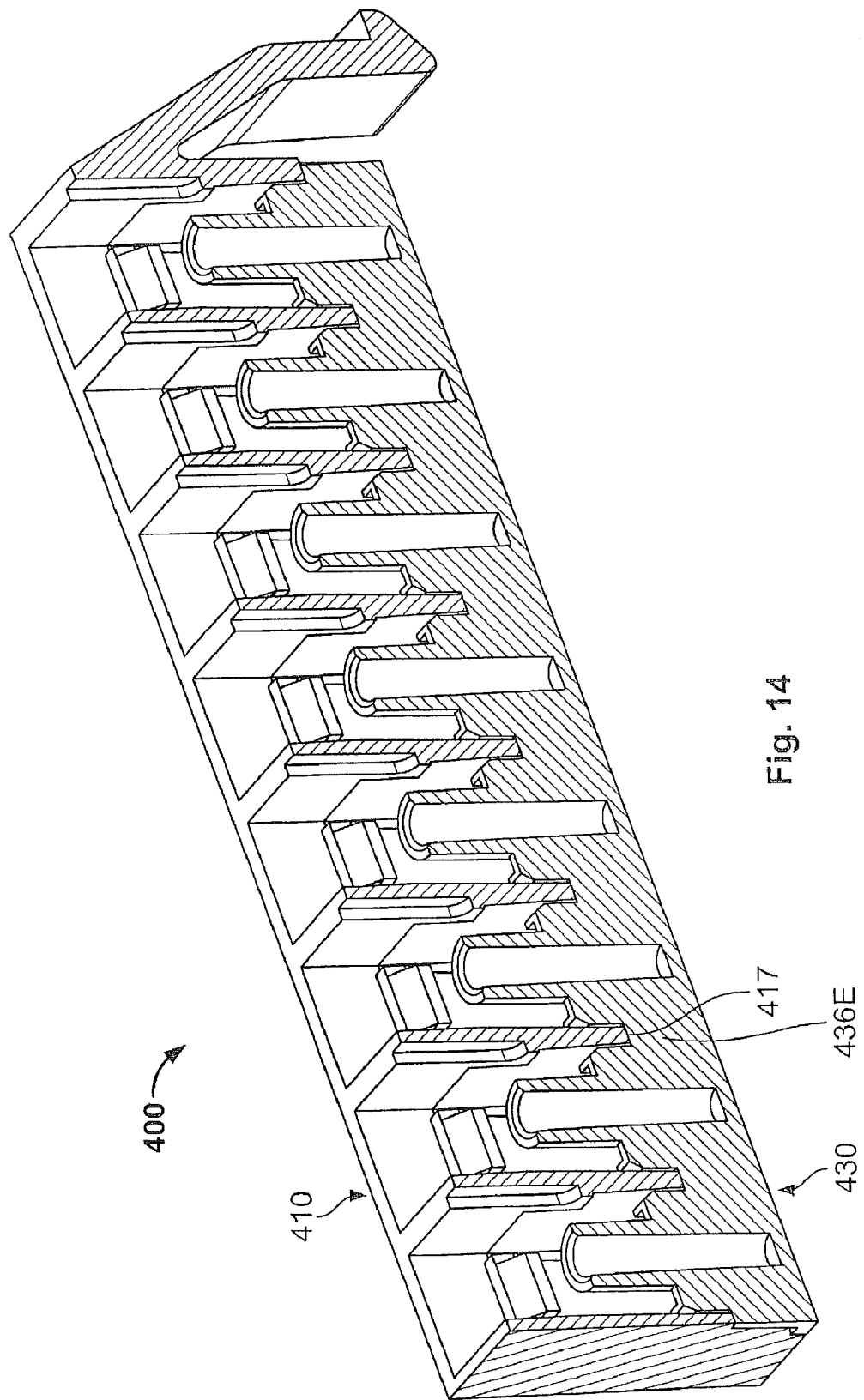
FIG. 14 is a cross-sectional, perspective view of the parking device of FIG. 13.

With reference to FIGS. 13 and 14, a parking device 400 according to further embodiments of the present invention is shown therein. The parking device 400 includes an adapter housing 410 and a dust cap member 430, which may be formed in the same manner as the adapter housing 210 and the dust cap member 230, except as follows. The parking device 400 differs from the parking device 200 in that the dust cap member 430 is secured to the housing 410 by an interference fit between insert portions 436E of the base strip 432 and slots 417 (FIG. 14) in the housing 410.

Parking devices as disclosed herein may be installed into an intended application (e.g., in a interconnect cabinet) using any suitable mechanism(s) such as via snap in latch/latches, mechanical fasteners, or adhesives.

While various techniques have been described herein for making the dust cap members 130, 230, 430 integral with the housings 110, 210, 410, any other suitable techniques or mechanisms may be used. For example, in parking devices according to embodiments of the present invention, the dust cover portion can be coupled or integrated with the corresponding housing by a snap fit, adhesive, adhesive tape, mechanical fasteners, welding, and/or co-molding. In some embodiments, the dust cover portion and the housing may be formed of the same material and unitarily molded (i.e., molded as one piece) and/or machined from a unitary member.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A fiber optic connector storage apparatus for storing a fiber optic connector having a connector housing and an exposed ferrule extending from the connector housing, the fiber optic connector storage apparatus comprising:
   an adapter housing defining a socket to receive and hold the connector housing, the adapter housing including a panel mounting structure configured to secure the fiber optic connector storage apparatus to a mounting panel; and
   a dust cap portion integral with the adapter housing and configured to receive and protect the exposed ferrule when the connector housing is inserted into the socket.

2. The fiber optic connector storage apparatus of claim 1 wherein the panel mounting structure includes a mount tab configured to receive a fastener to secure the fiber optic connector storage apparatus to the mounting panel.

3. The fiber optic connector storage apparatus of claim 1 wherein the panel mounting structure includes a snap tab to secure the fiber optic connector storage apparatus to the mounting panel.

4. The fiber optic connector storage apparatus of claim 1 wherein the dust cap portion is configured to conform to the ferrule when the exposed ferrule is inserted in the dust cap portion to limit exposure of the ferrule to contaminants.

5. The fiber optic connector storage apparatus of claim 4 wherein the dust cap portion is configured to form an air-tight fit about the exposed ferrule when the exposed ferrule is inserted in the dust cap portion.

6. The fiber optic connector storage apparatus of claim 1 wherein the adapter housing includes a connector mounting structure configured to secure the connector housing in the socket when the connector housing is inserted into the socket.

7. The fiber optic connector storage apparatus of claim 6 wherein the connector mounting structure includes a connector latch structure configured to interlock with the connector housing and thereby secure the connector housing in the socket.

8. The fiber optic connector storage apparatus of claim 1 wherein the dust cap portion is separately formed from and coupled to the adapter housing.

9. The fiber optic connector storage apparatus of claim 8 including a retention mechanism configured to releasably secure the dust cap portion to the adapter housing.

10. The fiber optic connector storage apparatus of claim 1 wherein:
   the adapter housing defines a plurality of sockets each configured to receive and hold a connector housing of a respective fiber optic connector; and
   the fiber optic connector storage apparatus includes a plurality of dust cap portions integral with the adapter housing and associated with a respective one of the plurality of sockets, wherein each dust cap portion is configured to receive the respective connector housing and protect the exposed ferrule thereof when the respective connector housing is inserted into the socket.

11. The fiber optic connector storage apparatus of claim 10 wherein the dust cap portions each form a part of an integral dust cap member.

12. The fiber optic connector storage apparatus of claim 11 wherein the integral dust cap member is separately formed from and coupled to the adapter housing.

13. The fiber optic connector storage apparatus of claim 12 wherein the integral dust cap member includes a mechanical retention structure to couple the integral dust cap member to the adapter housing.

14. The fiber optic connector storage apparatus of claim 1 wherein the fiber optic connector is an FC-type fiber optic connector or an SC-type fiber optic connector.

15. The fiber optic connector storage apparatus of claim 1 including:
   a splitter module;
   a connectorized optical fiber having one end adjoining the splitter module and a fiber optic connector mounted on an opposed end;

wherein the connector housing is installed in the socket so that the splitter module is coupled to the adapter housing by the connectorized optical fiber.

16. An optical fiber management system for use with a fiber optic connector having a connector housing and an exposed ferrule extending from the connector housing, the optical fiber management system comprising:
   an interconnect cabinet having a mounting panel; and
   a fiber optic connector storage apparatus including:
      an adapter housing mounted on the mounting panel and defining a socket to receive and hold the connector housing; and
      a dust cap portion integral with the adapter housing and configured to receive and protect the exposed ferrule when the connector housing is inserted into the socket.

17. The optical fiber management system of claim 16 wherein the adapter housing includes a panel mounting structure securing the fiber optic connector storage apparatus to the mounting panel.

18. The optical fiber management system of claim 16 including:
   a splitter module mounted on the interconnect cabinet;
   a connectorized optical fiber having one end adjoining the splitter module and a fiber optic connector mounted on an opposed end;
   wherein the connector housing is installed in the socket so that the splitter module is coupled to the adapter housing by the connectorized optical fiber.

19. A method for storing a fiber optic connector having a connector housing and an exposed ferrule extending from the connector housing, the method comprising:
   providing a fiber optic connector storage apparatus including:
      an adapter housing mounted on a mounting panel and defining a socket to receive and hold the connector housing; and
      a dust cap portion integral with the housing and configured to receive and protect the exposed ferrule when the connector housing is inserted into the socket; and
   with the adapter housing mounted on the mounting panel, inserting the connector housing into the socket such that the exposed ferrule is received in and protected by the dust cap portion.

20. The method of claim 19 wherein the adapter housing includes a panel mounting structure and the method includes securing the fiber optic connector storage apparatus to the mounting panel using the panel mounting structure.

21. The method of claim 19 including:
   removing the fiber optic connector from the socket and the dust cap portion; and thereafter
   inserting the fiber optic connector in an interconnection jack to effect an optical fiber communication link through the fiber optic connector.

22. A fiber optic connector storage apparatus for storing a fiber optic connector having a connector housing and an exposed ferrule extending from the connector housing, the fiber optic connector storage apparatus comprising:
   an adapter housing defining a socket to receive and hold the connector housing, the adapter housing including a connector mounting structure configured to secure the connector housing in the socket; and
   a dust cap portion integral with the adapter housing and configured to receive and protect the exposed ferrule when the connector housing is inserted into the socket and secured in the socket by the connector mounting structure.

23. The fiber optic connector storage apparatus of claim 22 wherein the connector mounting structure includes a connector latch structure configured to interlock with the connector housing and thereby secure the connector housing in the socket.

24. A fiber optic connector storage apparatus for storing a fiber optic connector having a connector housing and an exposed ferrule extending from the connector housing, the fiber optic connector storage apparatus comprising:
   an adapter housing defining a socket to receive and hold the connector housing; and
   a dust cap portion integral with the adapter housing and configured to receive and protect the exposed ferrule when the connector housing is inserted into the socket;
   wherein the dust cap portion is separately formed from and coupled to the adapter housing.

* * * * *